(12) United States Patent
Sarazin

(10) Patent No.: US 11,183,218 B2
(45) Date of Patent: Nov. 23, 2021

(54) DUAL-POCKET STORAGE SLEEVES FOR VINYL RECORDS AND JACKETS THEREOF

(71) Applicant: Michael Sarazin, Winnipeg (CA)

(72) Inventor: Michael Sarazin, Winnipeg (CA)

(*) Notice: Subject to any disclaimer, the term of this patent is extended or adjusted under 35 U.S.C. 154(b) by 9 days.

(21) Appl. No.: 16/701,472

(22) Filed: Dec. 3, 2019

(65) Prior Publication Data

US 2020/0286518 A1 Sep. 10, 2020

Related U.S. Application Data

(60) Provisional application No. 62/813,984, filed on Mar. 5, 2019.

(51) Int. Cl.
*G11B 23/03* (2006.01)
*B65D 85/57* (2006.01)

(52) U.S. Cl.
CPC ........ *G11B 23/0317* (2013.01); *B65D 85/544* (2013.01)

(58) Field of Classification Search
CPC ........ B65D 27/08; B65D 30/22; B65D 33/16; B65D 85/30; B65D 85/544; B65D 85/548; B65D 85/57; G11B 23/0317; G11B 23/03
USPC .............................. 206/309, 312–313; 383/38
See application file for complete search history.

(56) References Cited

U.S. PATENT DOCUMENTS

| | | | | |
|---|---|---|---|---|
| 2,776,085 A | * | 1/1957 | Furey | B65D 27/10 229/69 |
| 3,473,653 A | * | 10/1969 | Nunes | B65D 85/544 206/205 |
| 3,826,360 A | * | 7/1974 | Shore | B65D 85/548 206/312 |
| 4,566,590 A | * | 1/1986 | Manning | B65D 85/544 206/216 |
| 4,720,040 A | * | 1/1988 | Gurewitz | B65D 33/34 383/38 |
| 5,207,717 A | * | 5/1993 | Manning | G11B 23/023 206/232 |
| 5,595,293 A | * | 1/1997 | Miller | B65D 85/548 206/308.1 |
| 5,595,798 A | * | 1/1997 | Miller | B65D 85/548 206/308.1 |
| 6,443,301 B2 | * | 9/2002 | Garnier | B65D 85/548 206/308.1 |
| 2006/0023974 A1 | * | 2/2006 | Zimmerman | B65D 31/12 383/38 |
| 2010/0142861 A1 | * | 6/2010 | Sam | B65D 33/2591 383/38 |

* cited by examiner

*Primary Examiner* — Bryon P Gehman
(74) *Attorney, Agent, or Firm* — Kyle R Satterthwaite; Ryan W Dupuis; Ade & Company Inc.

(57) ABSTRACT

A vinyl record storage device features separate pockets for isolated storage of the vinyl record and its associated outer jacket. The jacket-holding pocket features a selectively openable and recloseable closure normally kept in a closed position, even during insertion and removal of the record to and from the other pocket, to maintain the jacket in pristine condition.

10 Claims, 3 Drawing Sheets

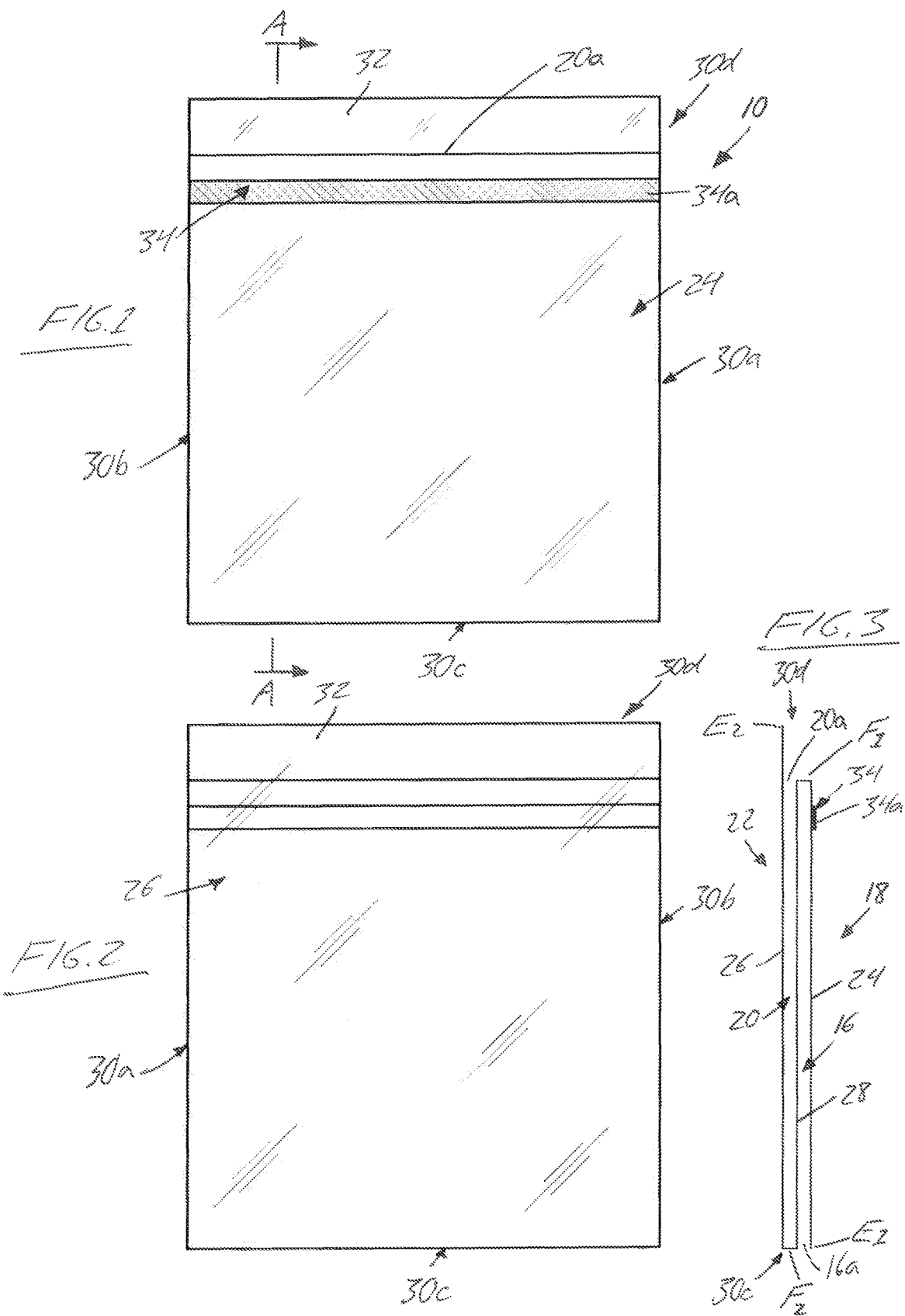

DUAL-POCKET STORAGE SLEEVES FOR VINYL RECORDS AND JACKETS THEREOF

CROSS-REFERENCE TO RELATED APPLICATIONS

This application claims benefit under 35 U.S.C. 119(e) of U.S. Provisional Application No. 62/813,984, filed Mar. 5, 2019, the entirety of which is incorporated herein by reference.

FIELD OF THE INVENTION

The present invention relates generally to storage of vinyl records, and more particularly to protective sleeves for storing vinyl records and their associates record jackets.

BACKGROUND

Vinyl records are typically distributed in cardboard outer jackets with artwork and track listing printed thereon. Inside the jacket, the record itself is typically disposed within an inner liner of softer material than the stiffer outer jacket. This inner liner shields the record from dust accumulation and static buildup, and protects the record during insertion and removal to and from the outer jacket. In order to keep the record jackets in pristine condition, it is known to store each record and its jacket inside a polymeric outer sleeve of sufficiently transparency or translucency to enable viewing of the jacket through the outer sleeve. Some collectors place the record and inner linear behind the jacket, while others storage the record and inner liner inside the jacket. In either case, there's a risk of wear and tear to the jacket as the record each time the record and inner liner are inserted and removed to and from the outer sleeve.

Accordingly, there remains room for improvement in the field of vinyl record and jacket storage.

SUMMARY OF THE INVENTION

According to one aspect of the invention, there is provided a storage device for a vinyl record and associated record jacket, said apparatus comprising a storage sleeve comprising a first storage pocket for holding said vinyl record therein and a second storage pocket for holding said record jacket therein, wherein a perimeter of each storage pocket comprises three closed perimeter sides and one open perimeter side, and the sleeve comprises a selectively openable and recloseable closure operable at the open perimeter side of the second storage pocket to enable insertion and removal of the record jacket to and from said second storage pocket when said openable and recloseable closure is in an open state, and to safely secure said record jacket within the second storage pocket when said openable and recloseable closure is in a closed state.

In use of the device, said record is received in said first storage pocket and is readily withdrawable therefrom through the open side of said first storage pocket, and the record jacket is received in said second storage pocket with the selectively openable/closable closure in the closed state safely securing said record jacket within said second storage pocket.

According to another aspect of the invention, there is provided a method of using the aforementioned storage device comprising, normally storing said record in the first storage pocket and normally storing said record jacket in the second storage pocket; removing the record from the first storage pocket at a time when playback of the record is desired; and with said record removed for playback, continuing to store the record jacket inside the second storage pocket, during which the closed state of the selectively openable and recloseable closure safely confines the record jacket to said second storage pocket.

BRIEF DESCRIPTION OF THE DRAWINGS

Preferred embodiments of the invention will now be described in conjunction with the accompanying drawings in which:

FIG. 1 is a rear view of a dual-pocket vinyl record storage sleeve of the present invention.

FIG. 2 is a front view of the storage sleeve of FIG. 1.

FIG. 3 is a cross-sectional view of the storage sleeve of FIG. 1, as viewed along line A-A thereof.

DETAILED DESCRIPTION

Figure 4:
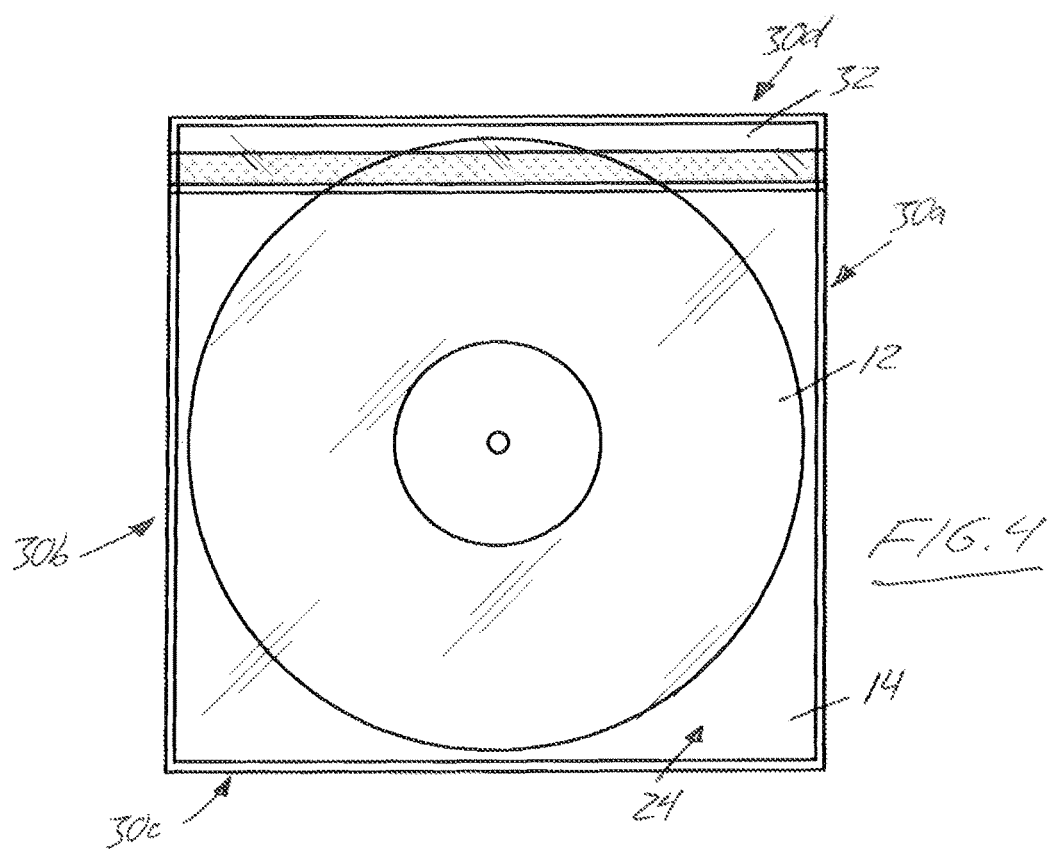
FIG. 4 is a rear view of the storage sleeve of FIG. 1 while storing a vinyl record and its associated jacket in the two separate storage pockets of the sleeve.

The drawings show preferred embodiments of a storage device 10 for a vinyl record and its associated cardboard jacket. The storage device 10 is a dual-pocket sleeve, the two distinct storage pockets of which are used to respectively store the vinyl record 12 and the cardboard record jacket 14. The first storage pocket 16 in which the vinyl record 12 is stored resides at a rear 18 of the sleeve, while the second storage pocket 20 in which the record jacket 14 is stored resides at an opposing front 22 of the sleeve. Each storage pocket is delimited between a respective outer wall 24, 26 of the sleeve, and a central divider wall 28 that resides between the two outer walls 24, 26 and separates the two storage pockets 16, 20 from one another. The outer wall 24 of the first storage pocket 16 thus denotes a rear face of the sleeve at the rear 18 thereof, while the outer wall 26 of the second storage pocket 20 denotes a front face of the sleeve at the front 22 thereof. The outer walls of the first and second storage pockets are thus also referred to herein as the front and rear walls 24, 26, respectively.

Both of the two outer walls 24, 26 are preferably transparent or translucent, each preferably being formed of a flexible polymeric film, which enables viewing of both the record jacket and the vinyl record itself from outside the sleeve. In other embodiments, transparency or translucency at only the front wall 26 may be sufficient, as the album is typically identifiable solely on the basis of the printed jacket content visible through the transparent/translucent front face of the sleeve. Preferred embodiments use a cast polypropylene (CPP) film as the constituent sleeve material, at least at one or both of the transparent/translucent outer walls thereof, though other materials may alternatively be employed. Polymeric films of varying thickness may be used among differently configured sleeve types, for example in a 2-mil thickness for cost-effective general use, and a greater 4-mil thickness offered at a higher price point and particularly useful for valuable rarities.

The overall sleeve, and each wall thereof, is rectangular in shape, whereby the sleeve has four perimeter sides. At opposing first and second perimeter sides 30a, 30b of the sleeve, all three walls 24, 26, 28 are coterminous with one another and joined together over the full length of this perimeter side, for example by welded heat seals created using radio frequency welding, ultrasonic welding, or other heat-sealing techniques. At a third perimeter side 30c of the sleeve, all three walls are again coterminous, but only the front and divider walls are joined together. At the fourth perimeter side 30d of the sleeve, the divider wall 28 and rear wall 24 of the sleeve are coterminous and joined together, but the front wall 26 spans outwardly beyond the shared perimeter edge of the coterminous divider wall 28 and rear wall 24 to create a seamlessly integral closure flap 32 foldable over the coterminous walls.

As a result of the unsealed relationship between the rear wall 24 and divider wall 28 at the third perimeter side 30c of the sleeve, the first storage pocket 16 is open at this side 30c of the sleeve, thereby providing an access opening 16a to the first storage pocket. With exception of this access opening 16a, the first storage pocket 16 is otherwise closed on all sides due to the joined-together state of the rear wall 24 and divider wall 28 at on the three other perimeter sides of the sleeve 30a, 30b, 30d. Likewise, as a result of the unsealed relationship between the front wall 26 and the divider wall 28 at the fourth perimeter side 30d of the sleeve, the second storage pocket 20 is open at this side 30d of the sleeve, thereby providing an access opening 20a to the second storage pocket. With the exception of this accessing opening 20a, the second storage pocket 20 is otherwise closed on all sides due to the joined-together state of the front wall 26 and divider wall 28 at the three other perimeter sides of the sleeve 30a, 30b, 30c. Accordingly, each storage pocket has only one open perimeter side, and three closed perimeter sides. Two of the three closed perimeter sides of each storage pocket are coincident with two of the other storage pocket's three closed perimeter sides due to the sealed-together nature of all three sleeve walls 24, 26, 28 at the first and second perimeter sides 30a, 30b of the sleeve.

Figure 5:
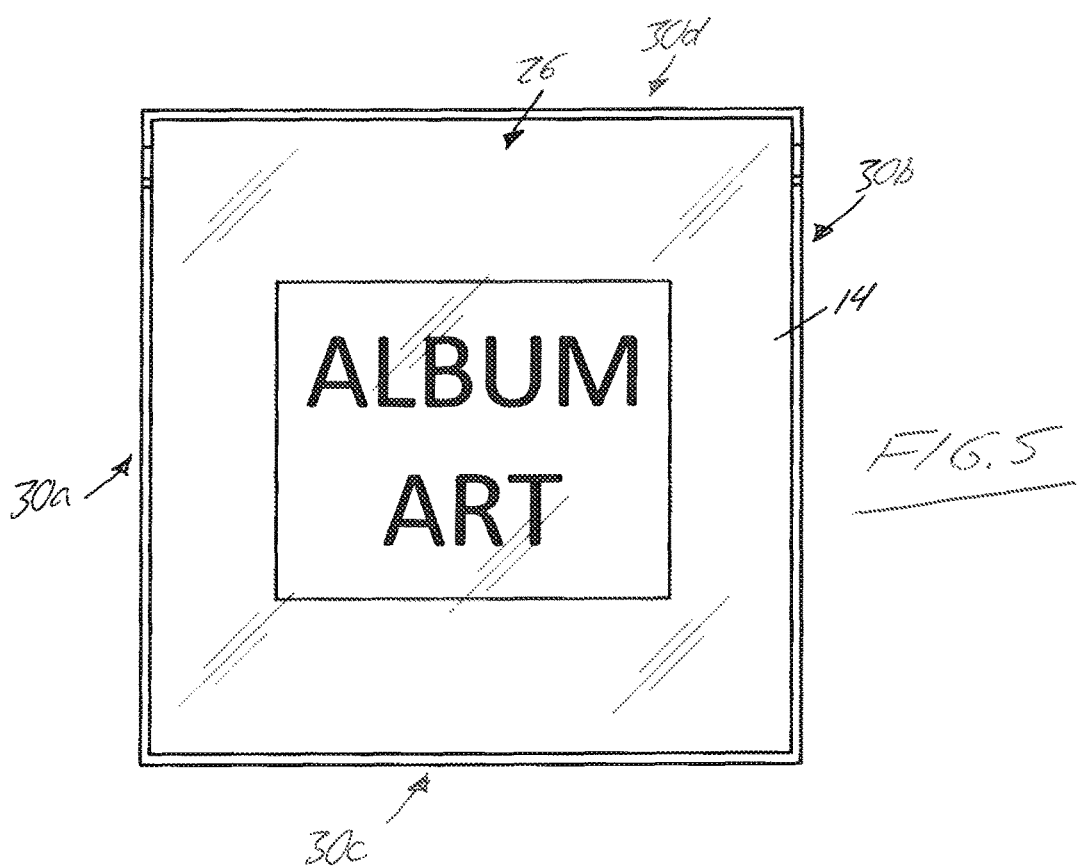
FIG. 5 is a front view of the storage sleeve of FIG. 4.

The foldable closure flap 32 is movable between an open position shown in FIGS. 1 and 3, where it resides in non-obstructive relationship to the access opening 20a of the second storage pocket 20, and a closed position shown in FIGS. 4 and 5, where it is folded over the access opening 20a of the second storage pocket 20 to the rear side of the sleeve. The exterior surface of the sleeve's rear wall 24 features a strip of recloseable tape 34 applied thereto in parallel relation to the shared perimeter edge of the front and divider walls past which the closure flap 32 extends in the open position. The recloseable tape 34 features an inner surface with a strong adhesive bond to the rear wall 24 to form an effectively permanent attachment thereto, and a tacky outer surface 34a capable of stick-and-release temporary bonding to the closure flap 32 when folded into the closed position. Accordingly, the closure flap 32 and recloseable tape 34 cooperatively form a selectively openable and re-closable closure by which the opening 20a of the second storage pocket 20 can be repeatedly opened and closed. When secured in the closed position, the flap 32 safely secures the record jacket in the second storage pocket 20 of the sleeve. When removal of the record jacket is desired, the closure is returnable to an open state by unfolding the temporarily bonded flap 32 to the open position to provide access to the interior of the second storage pocket.

Referring to FIG. 3, the entire sleeve in the illustrated embodiment is formed by a singular elongated sheet of flexible polymeric material folded into an S-pattern with two 180-degree folds $F_1$, $F_2$. A first area of the sheet spanning form a first free end $E_1$ thereof to the first 180-degree fold $F_1$ defines the rear wall 24 of the sleeve. A second middle area of the sheet spanning between the two 180-degree folds $F_1$, $F_2$ defines the divider wall 28. A third area of the sheet spanning from the second 180-degree fold $F_2$ to the second free end $E_2$ of the sheet defines the front wall 26 and the integrally attached closure flap 32. With the sheet folded flat to lay the three areas of the sheet flat against one another, the three areas are heat sealed together along the two longitudinal edges of the sheet to create the sealed first and second perimeter sides 30a, 30b of the sleeve. The first fold $F_1$ defines the remaining closed perimeter side of the first storage pocket 16, and the second folded $F_2$ defines the remaining closed perimeter side of the second storage pocket 20. The rear wall 24 and divider wall 28 are thus joined together in seamlessly integral fashion by the first fold $F_1$, and the front wall 26 and divider wall 28 are likewise joined together in seamlessly integral fashion by the second fold $F_2$. With the sheet folded and heat sealed, the recloseable tape strip 34 is then applied across the rear wall 24 in parallel and adjacent relation to the first fold $F_1$.

This particular folding and heat-sealing pattern results in the illustrated embodiment, where the open perimeter sides of the two storage pockets lie in opposition to one another at opposing perimeter sides of the sleeve. However, other embodiments may involve different relative placement of the various sealed and unsealed edges of the walls and/or assembly of the sleeve from multiple pieces heat-sealed or otherwise secured together pieces, thus changing the relative positions of the two access openings of the finished sleeve. It will also be appreciated that in such multi-piece embodiments, the different walls of the sleeve need not necessarily all be made of the same material like they are in the single-piece sleeve of the illustrated embodiment.

Furthermore, while the illustrated embodiment employs a flap and cooperating strip of recloseable tape as the selectively openable/recloseable closure, it will be appreciated that other closures similarly movable between open and closed states, and securable in the closed state, may alternatively be used. Where recloseable tape is used, it will be appreciated that it need not necessarily be applied in an elongated strip spanning a full or substantially full width of the flap like in the illustrated embodiment. Alternative application of the tacky retaining substance at a singular point or a series of discrete points spaced apart across the width of the flap may provide sufficient retention of the flap in the closed position.

In the illustrated embodiment, the tape is applied to the outer wall of the first compartment rather than to the foldable closure flap, which helps avoid inadvertent sticking of the tape's tacky substance to the record jacket during insertion and withdrawal thereof to and from the sleeve. However, the in less preferable embodiments, the flap-retention substance may be alternatively be affixed to the flap itself. Though not illustrated, the tacky outer side of the tape preferably leaves the manufacturer in a covered state residing under a removable concealment strip, which is only later removed by the end-user of the sleeve when a record jacket is placed in the sleeve for the first time.

Alternative closure options include other types of flap-based closures that omit the use of a tacky flap retention substance, and instead rely on some other feature to secure the flap in the closed position. In one such alternative, a fixed flap may be attached to the outside of the rear wall and secured thereto on all sides of the flap, except that which faces the fourth perimeter side 30d of the sleeve, thereby creating a retaining pocket into which the foldable flap 32 is insertable to hold the foldable flap 32 in the closed position. Alternatively, a retaining slot may be cut in the rear wall in place of the tape 32 or fixed pocket for tucking of the foldable flap into the slot to retain the foldable flap in the closed position, though this may be less preferable to the tape or retaining pocket options, as such slot risks introduction of dust or other environmental contaminants into the first pocket 16.

Another alternative closure option is a zipper seal of the type commonly found on freezer bags in the food packaging industry. In such instance, the closure flap 32 may optionally be omitted altogether, with the mating halves of the zipper seal instead being defined on in the inner surface of the sleeve's front wall and the front-facing surface of the sleeve's divider wall.

Figure 6:
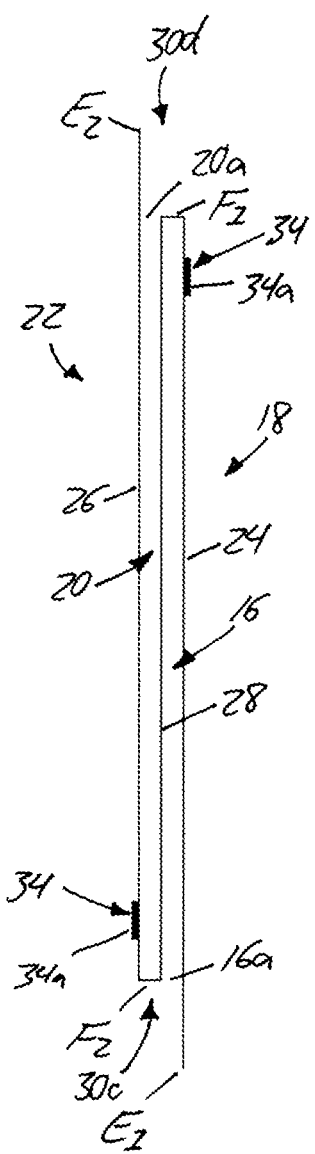
FIG. 6 is a cross-sectional view of a second embodiment of the dual-pocket vinyl record storage sleeve, as viewed in the same cross-sectional plane as FIG. 3.

While the first embodiment shown in FIGS. 1 through 5 has an openable and recloseable closure on only the jacket-containing second pocket, thereby enabling easier and cleaner insertion and withdrawal of the vinyl record through a permanent opening 16a of the first picket without having to manipulate a closure each time, other embodiments may optionally employ an additional openable and recloseable closure on the record-containing first pocket, which may be of any of the different types described above for the closure of the second pocket. An example of this is shown in FIG. 6, where the additional closure is of the same type shown in the earlier figures, and so the flap of the additional closure is therefore be attached to the rear wall 24 as a seamlessly integral extension thereof, and the cooperating additional strip of recloseable tape would resides on the exterior surface of the front wall. Alternatively, a slot or retaining pocket could be provided on the front wall, or a zipper seal could be employed, with its mating halves respectively defined on the inner surface of the sleeve's rear wall and the rear-facing surface of the sleeve's divider wall.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A storage device comprising a storage sleeve comprising a first storage pocket for holding a vinyl record therein and a second storage pocket for holding a record jacket therein, wherein a perimeter of each storage pocket comprises first and second closed perimeter sides of parallel and opposing relation to one another, a third closed perimeter side of perpendicularly interconnecting relation to said first and second closed perimeter sides, and one open perimeter side of parallel and opposing relation to said third closed perimeter side, and the device comprises first and second selectively openable and recloseable closures operable at the open perimeter sides of the first and second storage pockets, respectively, to enable insertion and removal to and from said first and second storage pockets when said first and second openable and recloseable closures are in an open state, and to safely enclose the first and second storage pockets when said first and second openable and recloseable closures are in a closed state; wherein the open perimeter sides of the first and second storage pockets reside at opposing perimeter sides of the sleeve, each storage pocket has a respective outer wall that faces toward a central divider wall that separates the first and second storage pockets from one another, and the first and second closed perimeter sides of each storage pocket are sealed to said central divider wall; wherein the first and second selectively openable and recloseable closures respectively comprise first and second closure flaps that are seamlessly integral extensions of the outer walls of the first and second storage pockets, respectively; and wherein the sleeve consists solely of a singular unitary sheet of flexible polymeric material that is transparent or translucent and is folded into an S-pattern having two 180-degree folds that are each situated at the third closed perimeter side of a respective one of the storage pockets, and said singular unitary sheet of flexible polymeric material defines the respective outer walls of both storage pockets, the central divider wall between said respective outer walls, and both of the first and second closure flaps.

2. The storage device of claim 1 wherein the first and second selectively openable and recloseable closures comprise a tacky substance positioned to secure the first and second closure flaps in closed positions when folded over said open perimeter sides of the first and second storage pockets, respectively.

3. The storage device of claim 2 wherein said tacky substance spans a majority width of said each closure flap.

4. The storage device of claim 2 wherein said tacky substance is laid out in elongated strips.

5. The storage device of claim 1 wherein two of the first and second closed perimeter sides of the first storage pocket coincide with the first and second closed perimeter sides of the second storage pocket at a perimeter of the sleeve.

6. The storage device of claim 1 in combination with a record and a record jacket, wherein said record resides in said first storage pocket with the first closure flap closed at the open perimeter side of the first storage pocket to safely secure said record therein, and the record jacket resides in said second storage pocket with the second closure flap closed at the open perimeter side thereof to safely secure said record jacket therein.

7. A method of using the storage device of claim 1 comprising, storing a record in the first storage pocket and a record jacket in the second storage pocket with the first and second closure flaps closed at the open perimeter sides of the first and second storage pockets; at a time when playback of said record is desired, opening the first closure flap, but leaving the second closure flap closed, and removing said record from the first storage pocket; and with said record removed for playback, continuing to store said record jacket inside the second storage pocket with the second closure flap remaining closed at the open perimeter side of the second storage pocket to safely confine said record jacket therein.

8. A storage device comprising a storage sleeve comprising a first storage pocket for holding a vinyl record therein and a second storage pocket for holding a record jacket therein, wherein a perimeter of each storage pocket comprises first and second closed perimeter sides of parallel and opposing relation to one another, a third closed perimeter side of perpendicularly interconnecting relation to said first and second closed perimeter sides, and one open perimeter side of parallel and opposing relation to said third closed perimeter side, and the device comprises a selectively openable and recloseable closure operable at the open perimeter side of the second storage pocket to enable insertion and removal to and from said second storage pocket when said openable and recloseable closure is in an open state, and to safely enclose the second storage pocket when said openable and recloseable closure is in a closed state; wherein the open perimeter sides of the first and second storage pockets reside at opposing perimeter sides of the sleeve, each storage pocket has a respective outer wall that faces toward a central divider wall that separates the first and second storage pockets from one another, and the first and second closed perimeter sides of each storage pocket are sealed to said central divider wall; wherein the selectively openable and recloseable closure comprises a closure flap that is a seamlessly integral extension of the outer wall of the second storage pocket, and is a singular and only closure flap of the storage device, the first pocket of which is flapless at the open perimeter side thereof; and wherein the sleeve consists solely of a singular unitary sheet of flexible polymeric material that is transparent or translucent and is folded into an S-pattern having two 180-degree folds that are each situated at the third closed perimeter side of a respective one of the storage pockets, and said singular unitary sheet of flexible polymeric material defines the respective outer walls of both storage pockets, the central divider wall between said respective outer walls, and the closure flap.

9. The storage device of claim 8 in combination with a record and a record jacket, wherein said record resides in said first storage pocket and is readily withdrawable therefrom through the flapless open perimeter side thereof, and the record jacket resides in said second storage pocket with the closure flap closed at the open perimeter side thereof to safely secure said record jacket therein.

10. A method of using the storage device of claim 8 comprising, storing a record in the first storage pocket and a record jacket in the second storage pocket with the second closure flap closed at the open perimeter side of the second storage pocket; at a time when playback of said record is desired, removing said record from the first storage pocket through the flapless open perimeter side thereof while leaving the closure flap closed at the open perimeter side of the second storage pocket; and with said record removed for playback, continuing to store said record jacket inside the second storage pocket with the closure flap remaining closed at the open perimeter side of the second storage pocket to safely confine said record jacket therein.

\* \* \* \* \*